July 19, 1966   C. J. JOHNSON   3,261,492
WOODEN BOX CONSTRUCTION
Filed May 15, 1964   2 Sheets-Sheet 1
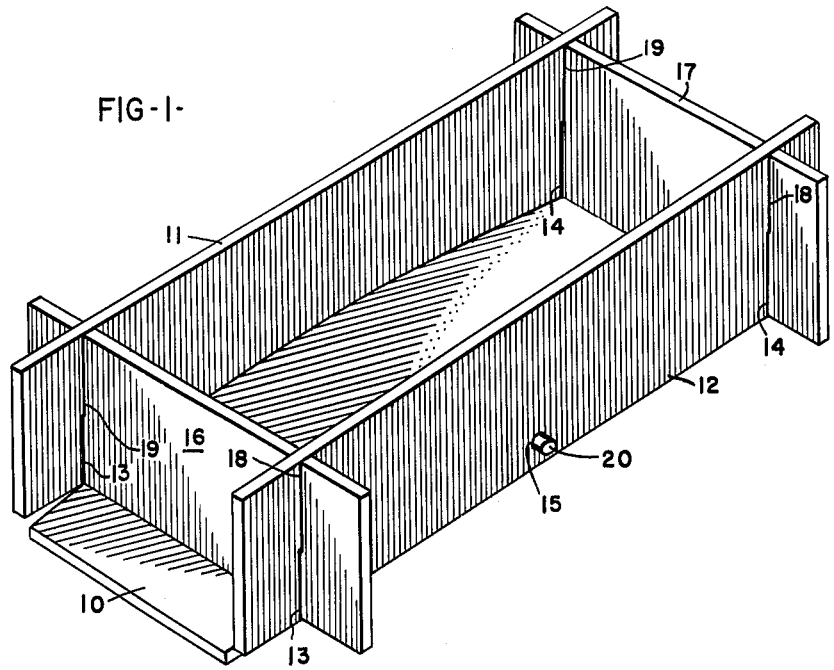
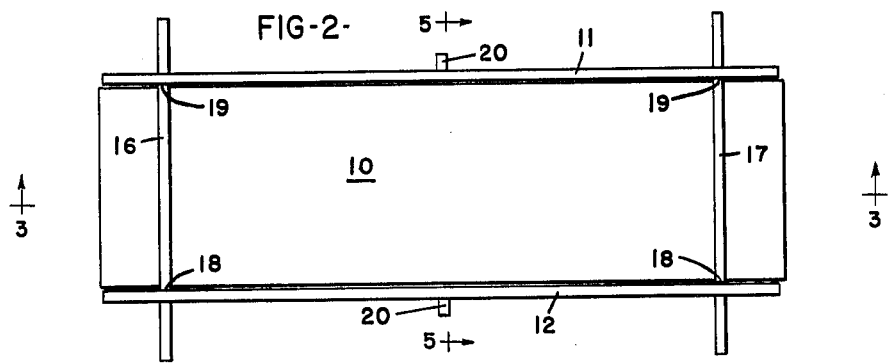
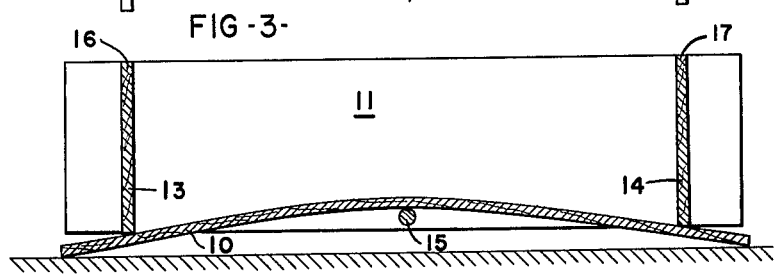
INVENTOR.
CHARLES J. JOHNSON
BY
ATTY'S.

July 19, 1966  C. J. JOHNSON  3,261,492
WOODEN BOX CONSTRUCTION
Filed May 15, 1964  2 Sheets-Sheet 2
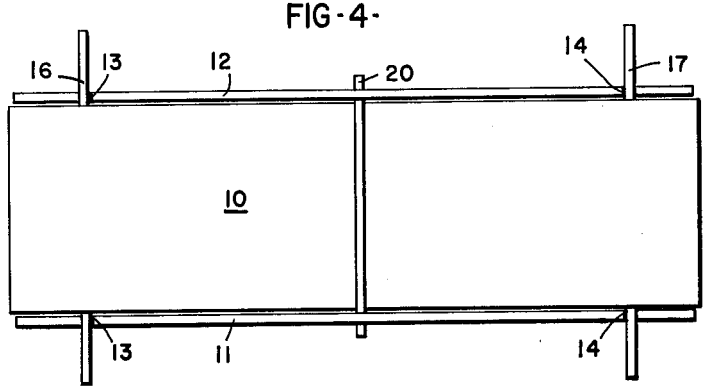
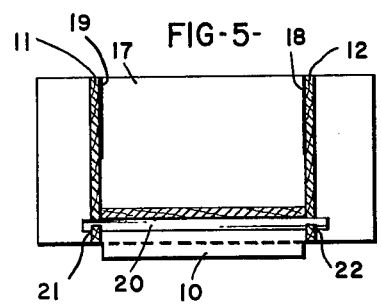
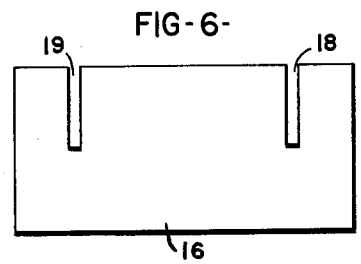
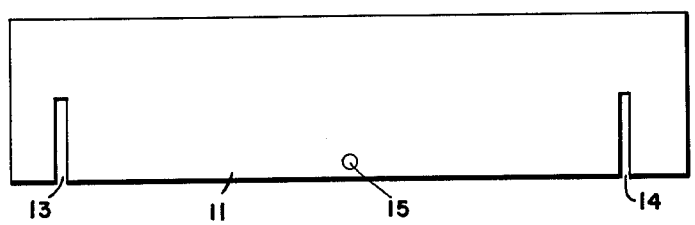
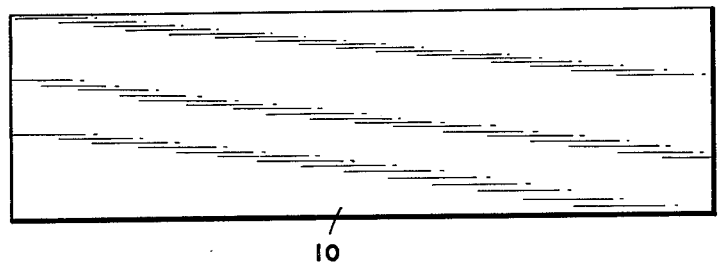
INVENTOR.
CHARLES J. JOHNSON
BY
ATTY'S.

3,261,492
WOODEN BOX CONSTRUCTION
Charles J. Johnson, Lewiston, Idaho, assignor to Potlatch Forests, Inc., Lewiston, Idaho, a corporation of Delaware
Filed May 15, 1964, Ser. No. 367,713
1 Claim. (Cl. 217—12)

My invention relates to boxes which are to be used where they may be filled with materials that are moist. The boxes must be capable of being stored in knocked down condition and quickly erected. When erected, they must be sturdy and capable of holding their general shape for a considerable period of time. They must be devoid of nails and similar fasteners that cannot be readily removed for restoring of the boxes in the knocked down condition.

It is the purpose of this invention to provide a wooden box comprising two side walls, two end walls, a bottom wall and a locking means such as a bar or dowel that holds the sides, ends and bottom together in assembled position.

The nature and advantages of my invention will appear more clearly from the following description and the accompanying drawings illustrating a preferred form of the invention. The description and drawings are intended to be illustrative only, however, and are not intended to limit the scope of the invention except insofar as it is limited by the claims.

In the drawings:

FIGURE 1 is a perspective view of the assembled box;

FIGURE 2 is a plan view of the box on a smaller scale;

FIGURE 3 is a sectional view taken on the line 3—3 of FIGURE 2;

FIGURE 4 is a bottom plan view of the box;

FIGURE 5 is a sectional view taken on the line 5—5 of FIGURE 2;

FIGURE 6 is a side view of a box end wall panel;

FIGURE 7 is a side view of a box side wall panel;

FIGURE 8 is a plan view of the box bottom wall panel; and

FIGURE 9 is a side view of the locking means.

Referring now to the drawings, this box has a bottom wall panel 10 which is rectangular in shape. It has no cuts or apertures in it. Preferably this panel 10 and the other panels of the box are constructed of exterior grade plywood; that is, a plywood which is put together with adhesive in such a way that it can withstand the normal outdoor wetting and drying without coming apart.

Two side wall panels 11 and 12 are provided. These panels are alike. Each side wall panel is rectangular and preferably of the same length as the bottom panel 10, although it may be shorter. Each panel 11 or 12 has a pair of slots 13 and 14 near its ends. These slots 13 and 14 extend up from the bottom edge of the panel half way to the top edge. The distance of the slots 13 and 14 from the ends of a side wall panel may vary, of course, but with walls of three-eighth inch plywood it has been found satisfactory to have the slots about three-fourths of an inch from the end of the panel.

Each of the panels 11 and 12 also has at least one small aperture 15 midway between its ends and close to its bottom edge. The function of this aperture 15 will be described later.

The end wall panels 16 and 17 are also rectangular. They are preferably of the same height as the side wall panels 11 and 12. These panels have spaced slots 18 and 19 spaced apart a distance equal to the width of the bottom wall panel 10. These slots are deep enough so that the lower edge of the end wall panels are substantially even with the lower edge of the side wall panels when the end panels 16 and 17 are set in the slots 13 and 14 of the side wall panels and the side wall panels 11 and 12 are set down in the slots 18 and 19 of the end wall panels as shown in FIGURE 1.

The ideal relation is to make the height of the end walls and side walls the same at their meeting corners and to make the slots 13, 14, 18 and 19 half of this height.

The side wall panels 11 and 12, the end wall panels 16 and 17 and the bottom 10 can all be assembled by putting the side wall panels and the end wall panels together with slots in each panel receiving the portions of the two adjacent panels between the closed ends of the slots therein and the opposite edges of said adjacent panels, as shown in FIGURES 1 and 2. The bottom panel 10 is then bowed up between the panels 11 and 12 and a locking device 20 is inserted through the two panels 11 and 12 and beneath the bowed up panel 10. This locking device 20 is shown as a dowel pin with notches 21 and 22 near its ends to seat in the apertures 15.

The resulting structure is a stable box wherein the resilience of the bottom wall panel 10 causes it to press up against the end wall panels 16 and 17 while it pulls down on the dowel pin 20 to hold the side wall panels down. The panels cannot move up or down at the corners. The side wall panels 11 and 12 extend below the side edges of the bottom wall panel 10 adjacent to the locking means 20 and this prevents any deviation from a rectangular configuration. The ends of the bottom panel 10 can rest upon a supporting surface as indicated in FIGURE 3.

I find that a box embodying my invention can be used for many purposes. One use is a box for use by florists and horticulturists for the reception of living plants. The boxes can be set up as needed, filled with soil into which the plants are set and then used as a container for the plants as long as necessary. A great number of units for making such boxes can be stored in a small space. No nails are needed. The box can be emptied and then broken down into its six parts merely by removing the member 20, and lifting up the side wall panels 11 and 12. The notches 21 and 22 are not required in the member 20. Friction normally will retain it in place. With the notches, however, it can be seen that the side wall panels 11 and 12 are restrained from bowing out to produce wider cracks between them and the side edges of the bottom wall panel 10.

Having described my invention, I claim:

A collapsible box comprising two side wall panels, having slots extending up from their bottom edges about half the width thereof;

two end wall panels having slots extending down from their top edges about half the width thereof;

a bottom wall panel on which said end wall panels rest and providing a bottom for the space between said side and end wall panels, with the side wall panels extending down into the slots of the end walls and the end wall panels extending up into the slots of the side walls;

the bottom wall panel being extended up between the side wall panels; and locking means carried by the side wall panels at points spaced from the end wall panels and frictionally engaged against the lower surface of said bottom wall panel, and the bottom wall panel is resilient and is bowed upward between the side wall panels and the locking means is a bar that extends through the side wall panels.

References Cited by the Examiner

UNITED STATES PATENTS

| 1,910,089 | 2/1933 | Chomik | 217—12 |
| 1,923,881 | 8/1933 | Palais | 217—12 |
| 2,915,040 | 12/1959 | Ward | 217—12 |
| 3,143,236 | 8/1964 | Haas | 217—12 |
| 3,185,339 | 5/1965 | Fleming | 220—65 |

THERON E. CONDON, *Primary Examiner.*

R. H. SCHWARTZ, *Assistant Examiner.*